(12) United States Patent
Horng (10) Patent No.: US 6,400,053 B1
(45) Date of Patent: Jun. 4, 2002

(54) AXLE BALANCE PLATES FOR D.C BRUSHLESS MOTOR

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 8 days.

(21) Appl. No.: 09/712,959

(22) Filed: Nov. 16, 2000

(51) Int. Cl.$^7$ .......................... H02K 7/00; H02K 29/08; F04B 17/03
(52) U.S. Cl. ........................ 310/91; 310/67 R; 417/354; 417/423.14; 417/423.1
(58) Field of Search .............................. 310/67 R, 68 B, 310/42, 91, 254, 162, 89; 360/99.07, 99.04, 98.09; 417/423.1, 423.12, 423.7, 423.14, 354

(56) References Cited

U.S. PATENT DOCUMENTS

| | | | |
|---|---|---|---|
| 4,861,237 A | * | 8/1989 | Shiraki et al. ............. 310/68 R |
| 5,492,458 A | * | 2/1996 | Horng ......................... 310/254 |
| 6,050,785 A | | 4/2000 | Horng ......................... 417/354 |
| 6,285,108 B1 | * | 9/2001 | Horng ......................... 310/259 |
| 6,315,529 B1 | * | 11/2001 | Hu ............................ 417/423.1 |

* cited by examiner

Primary Examiner—Tran Nguyen
(74) Attorney, Agent, or Firm—Bacon & Thomas (57) ABSTRACT

A D.C brushless motor includes a housing, a circuit board, a balance plate, a stator, a rotor, and a magnetically non-inductive member. The housing includes a compartment, and a bottom wall that defines the compartment includes a tube seat formed thereon for engaging with an axle tube of the stator, which, in turn, receives a rotational shaft of the rotor. The rotor includes a permanent magnet mounted to an inner periphery thereof. The balance plate includes a fixing hole so as to be mounted around the axle tube of the stator, wherein there is a gap between an inner periphery defining the fixing hole and the axle tube. The balance plate is made of magnetically inductive material such that the balance plate and the permanent magnet attract each other. The magnetically non-inductive member avoids contact between the pole plate of the stator and the balance plate. In addition, the magnetically non-inductive member may include a flange inserted into the gap between the inner periphery of the fixing hole of the balance plate and the axle tube.

8 Claims, 8 Drawing Sheets

AXLE BALANCE PLATES FOR D.C BRUSHLESS MOTOR

BACKGROUND OF THE INVENTION

1. Field of the Invention

The present invention relates to D.C brushless motor, and more particularly to D.C brushless motor each having a balance plate for assuring stable rotational movement of the rotor axle, wherein the balance plate can be fixed easily and wherein the balance plate has a gap to a metal axle tube and to an adjacent pole plate of the stator so that the balance plate is not magnetized when the stator is energized.

2. Description of the Related Art

U.S. Pat. No. 6,050,785 to Horng issued on Apr. 18, 2000 discloses D.C brushless motor each comprising a housing, a circuit board, a balance plate, a stator, a rotor, and a cover plate. The balance plate and a permanent magnet on the rotor attract each other to assure stable rotational movements of the rotor relative to the stator. Nevertheless, it was found that manufacture of such D.C brushless motor is troublesome and inconvenient when considering fixing of the balance plate and preventing magnetic inductivity between the polar plate and the balance plates of the stator and the axle tube.

SUMMARY OF THE INVENTION

It is an object of the present invention to provide an improved D.C brushless motor that includes a balance plate which can be positioned or fixed easily and which has no magnetic inductivity with the pole plates of the stator and the axle tube.

In accordance with the present invention, a D.C brushless motor includes a housing, a circuit board, a balance plate, a stator, a rotor, and a magnetically non-inductive member. The housing includes a compartment, and a bottom wall that defines the compartment. A tube seat formed thereon for engaging with an axle tube of the stator. The central hole of axle tube receives a rotational shaft of the rotor. The rotor includes a permanent magnet mounted to an inner periphery thereof. The balance plate includes a fixing hole so as to be mounted around the axle tube of the stator, wherein there is a gap between an inner periphery defining the fixing hole and the axle tube. The balance plate is made of magnetically inductive material such that the balance plate and the permanent magnet attract each other. The magnetically non-inductive member avoids contact between the pole plate of the stator and the balance plate. In addition, the magnetically non-inductive member may include a flange inserted into the gap between the inner periphery of the fixing hole of the balance plate and the axle tube.

Other objects, advantages, and novel features of the invention will become more apparent from the following detailed description when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 1:
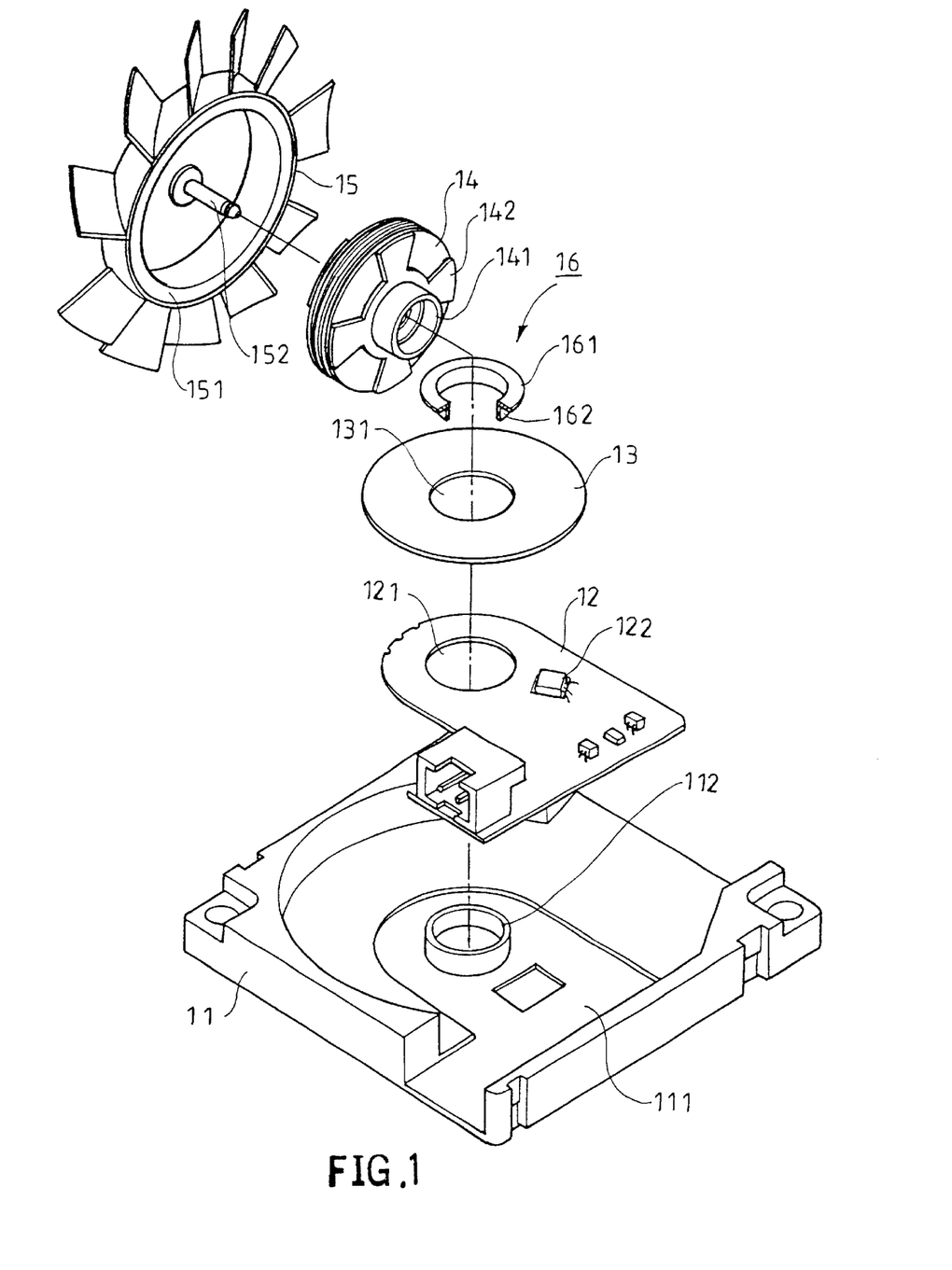
FIG. 1 is an exploded perspective view of a first embodiment of a D.C brushless motor in accordance with the present invention.

Referring to FIG. 1, a first embodiment of a D.C brushless motor in accordance with the present invention generally includes a housing 11, a circuit board 12, a balance plate 13, a stator 14, a rotor 15, and a magnetically non-inductive member 16. Still referring to FIG. 1, and further to FIGS. 2 and 3, the housing 11 includes a compartment 111, and a bottom wall that defines the compartment 111 and a tube seat 112 formed thereon. The tube seat 112 of the housing 11 may be a tube projecting from the bottom wall of the housing 11. The circuit board 12 includes a fixing hole 121 so as to be mounted around the tube seat 112. A Hall sensor 122 and other electric elements are mounted on the circuit board 12. The balance plate 13 is made of magnetically inductive material. The balance plate 13 is mounted above the circuit board 12 and includes a fixing hole 131 with a larger diameter such that an inner periphery defining the fixing hole 131 is not in contact with an axle tube 141 of the stator 14 when the balance plate is mounted around the axle tube 141 of the stator 14. Namely, there is an appropriate gap between the inner periphery defining the fixing hole 131 and the axle tube 141. The axle tube 141 of the stator 14 can be made by any conventional methods. The axle tube 141 is mounted to the tube seat 112. The rotor 15 includes a shaft 152 which is received in the axle tube 141. The rotor 15 further includes a permanent magnet 151 mounted to an inner periphery thereof. The magnetically non-inductive member 16 is made from magnetically non-inductive material and includes a ring 161 and a flange 162 extending downward from the ring 161. The flange 162 is inserted into the gap between the balance plate 13 and the axle tube 141. The balance plate 13 and the stator 14 are spaced by the ring 161.

Figure 2:
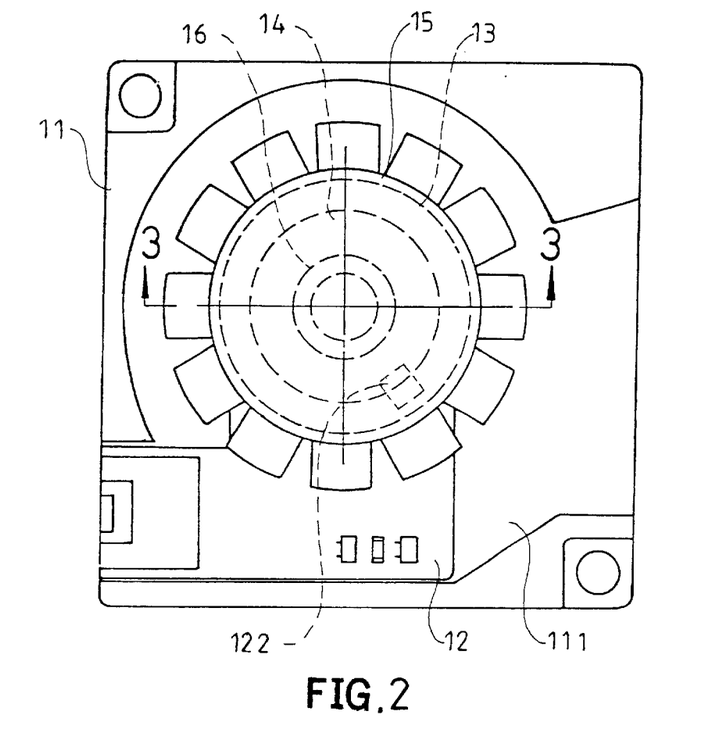
FIG. 2 is a top view of the D.C brushless motor in FIG. 1.
Figure 3:
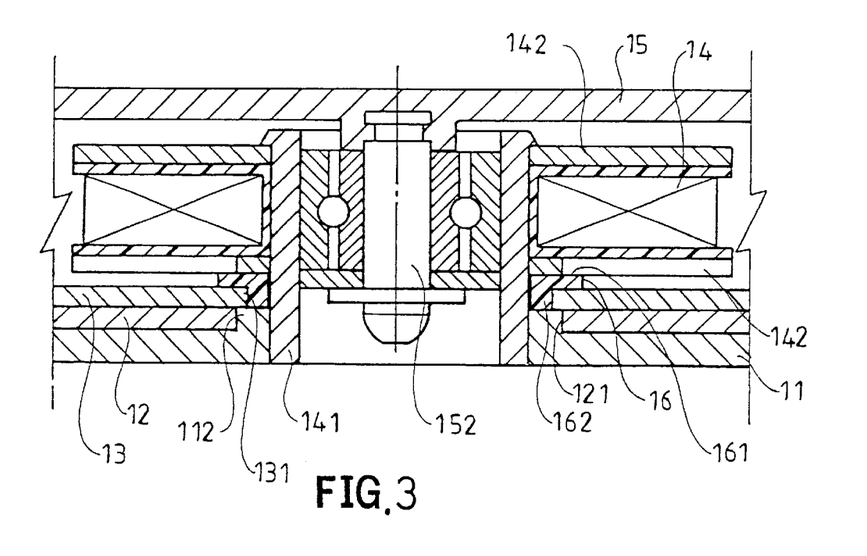
FIG. 3 is a sectional view taken along line 3—3 in FIG. 2.

In assembly, referring to FIGS. 2 and 3, the circuit board 12 is mounted around the tube seat 112 via the fixing hole 121. The axle tube 141 of the stator 14 is mounted to the tube seat 112. The balance plate 13 is mounted around the axle tube 141. The flange 162 of the magnetically inductive member 16 is inserted into the gap between the balance plate 13 and the axle tube 141. The balance plate 13 and a lower pole plate 142 of the stator 14 are spaced by the ring 161. Thus, there is no magnetic inductivity between the stator 14 and the balance plate 13. In addition, since the stator 14 is fixed, the balance plate 13 can be retained in place by means of the magnetically non-inductive ring member 16. As a result, easy assembly and reliable positioning of the balance plate 13 are obtained. The permanent magnet 151 and the balance plate 13 attract each other to thereby assure stable rotational movements of the rotor 15. In addition, there is no magnetic inductivity between the balance plate 13 and the stator 14.

Figure 4:
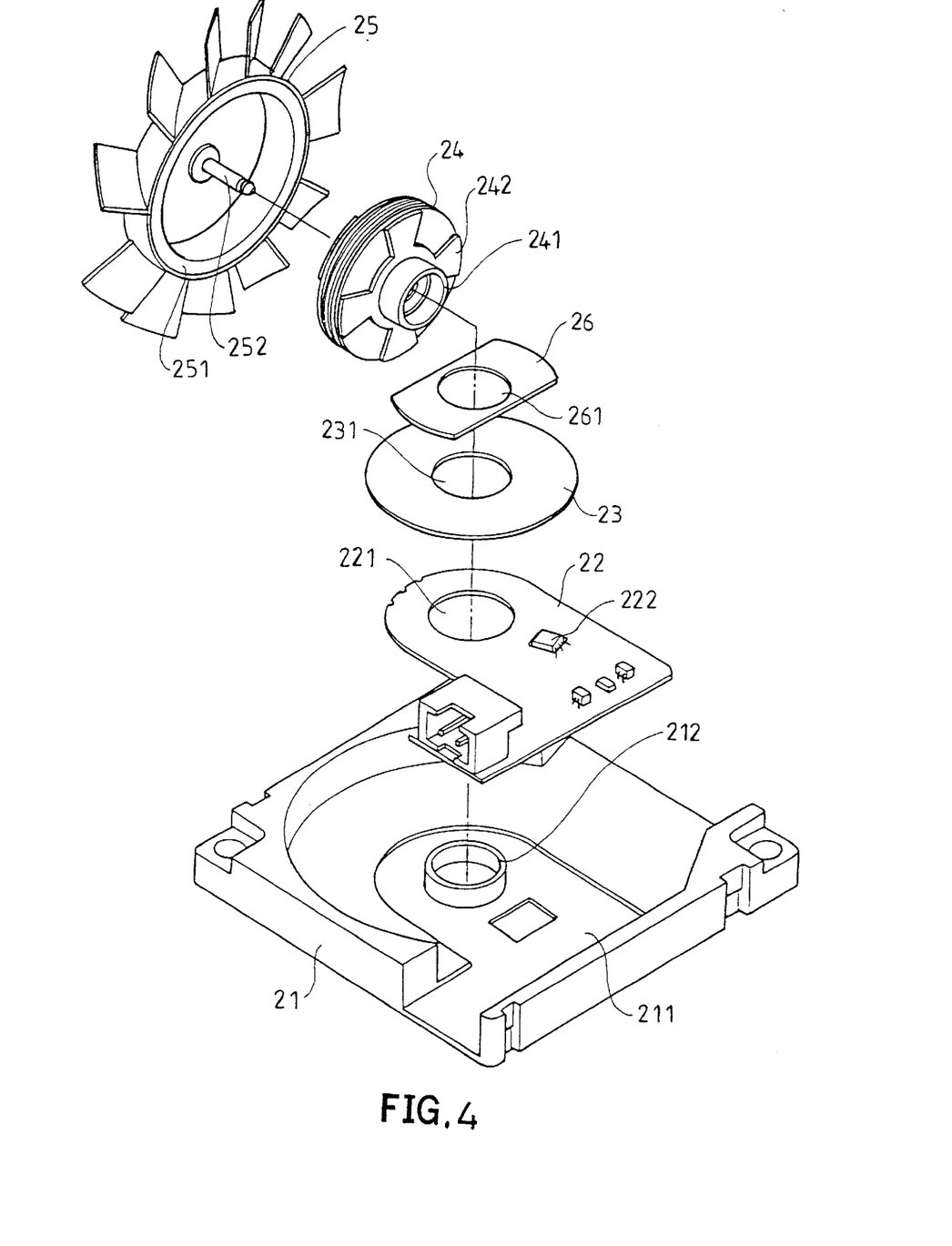
FIG. 4 is an exploded perspective view of a second embodiment of a D.C brushless motor in accordance with the present invention.

Referring to FIG. 4, a second embodiment of a D.C brushless motor in accordance with the present invention generally includes a housing 21, a circuit board 22, a balance plate 23, a stator 24, a rotor 25, and a magnetically non-inductive member 26. Still referring to FIG. 4, and further to FIGS. 5 and 6, the housing 21 includes a compartment 211, and a bottom wall that defines the compartment 211 and a tube seat 212 formed thereon. The tube seat 212 of the housing 21 may be a tube projecting from the bottom wall of the housing 21. The circuit board 22 includes a fixing hole 221 so as to be mounted around the tube seat 212. A Hall sensor 222 and other electric elements are mounted on the circuit board 22. The balance plate 23 is made of magnetically inductive material. The balance plate 23 is mounted above the circuit board 22 and includes a fixing hole 231 with a larger diameter such that an inner periphery defining the fixing hole 231 is not in contact with an axle tube 241 of the stator 24 when the balance plate 23 is mounted around the axle tube 241 of the stator 24. Namely, there is an appropriate gap between the inner periphery defining the fixing hole 231 and the axle tube 241.

Figure 5:
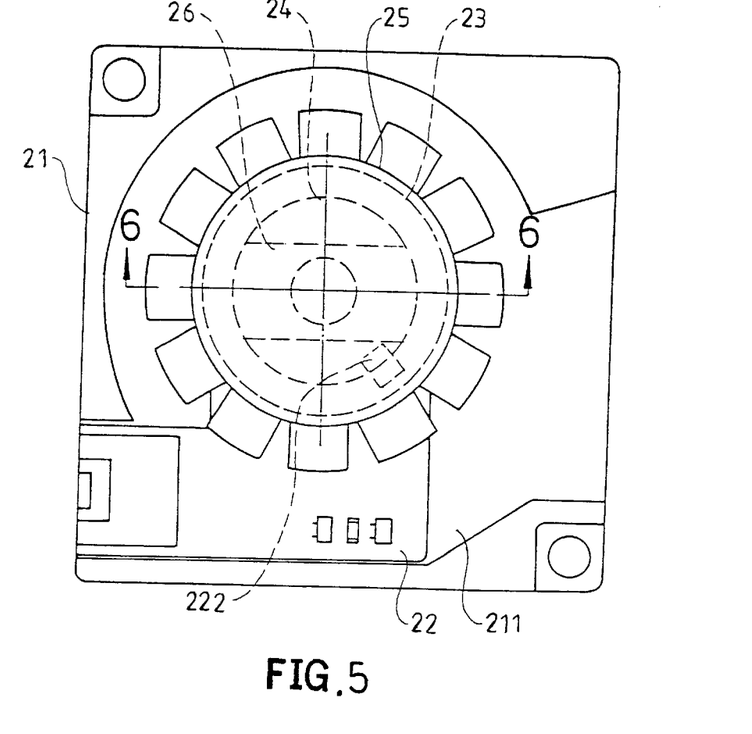
FIG. 5 is a top view of the D.C brushless motor in FIG. 4.
Figure 6:
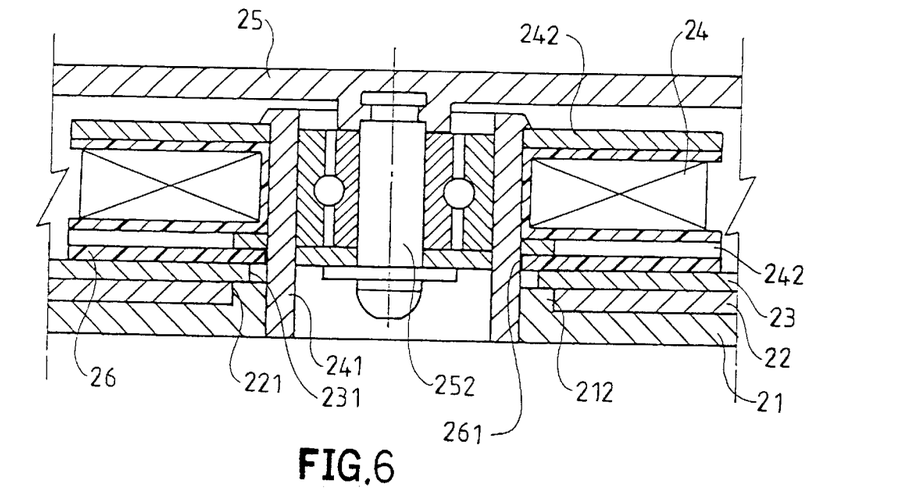
FIG. 6 is a sectional view taken along line 6—6 in FIG. 5.

The axle tube 241 of the stator 24 is made by any conventional methods and is mounted to the tube seat 212, while the rotor 25 includes a rotational shaft 252 which is received in the axle tube 241. The rotor 25 farther includes a permanent magnet 251 mounted to an inner periphery thereof. The magnetically non-inductive member 26 is substantially a plate made of magnetically non-inductive material. The magnetically non-inductive member 26 includes a hole 261 so as to be mounted around the axle tube 241 of the stator 24. When the axle tube 241 of the stator 24 is mounted to the tube seat 212, the magnetically non-inductive member 26 is pressed by a lower pole plate 242 of the stator 24 to thereby press against the balance plate 23 and the circuit board 22 indirectly. The balance plate 23 and the circuit board 22 are thus fixed, and the balance plate 23 is neither in contact with the axle tube 241 of the stator 24 nor in contact with the lower pole plate 242 of the stator 24.

In assembly, referring to FIGS. 5 and 6, the circuit board 22 is mounted around the tube seat 212 via the fixing hole 221. The axle tube 241 of the stator 24 is mounted to the tube seat 212. The balance plate 23 and the magnetically non-inductive member 26 are mounted around the axle tube 241. The magnetically non-inductive member 26 separates the lower pole plate 242 of the. stator 24 from the balance plate 23 to avoid magnetic inductivity therebetween. In addition, by means of fixing of the stator 24, the balance plate 23 is fixed indirectly via being pressed against by the magnetically non-inductive member 26. As a result, easy assembly and reliable positioning of the balance plate 23 are obtained. The permanent magnet 251 of the rotor 25 and the balance plate 23 attract each other to thereby assure stable rotational 14 movements of the rotor 25. In addition, there is no magnetic inductivity between the balance plate 23 and the stator 24.

Figure 7:
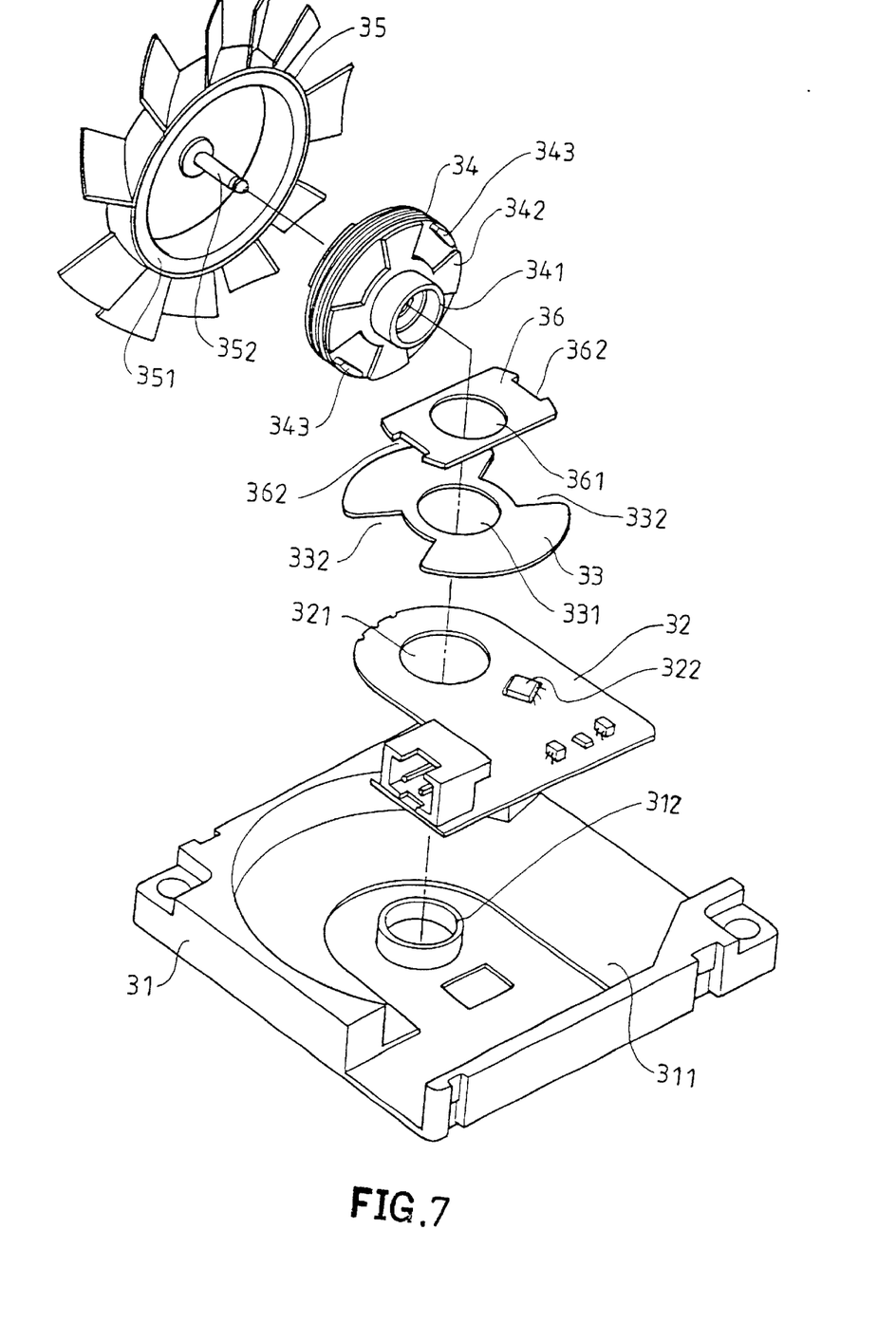
FIG. 7 is an exploded perspective view of a third embodiment of a D.C brushless motor in accordance with the present invention.

Referring to FIG. 7, a third embodiment of a D.C brushless motor in accordance with the present invention generally includes a housing 31, a circuit board 32, a balance plate 33, a stator 34, a rotor 35, and a magnetically non-inductive member 36. Still referring to FIG. 7, and further to FIGS. 8 and 9, the housing 31 includes a compartment 311, and a bottom wall that defines the compartment 311 and a tube seat 312 formed thereon. The tube seat 312 of the housing 31 may be a tube projecting from the housing 31. The circuit board 32 includes a fixing hole 321 so as to be mounted around the tube seat 312. A Hall sensor 322 and other electric elements are mounted on the circuit board 32. The balance plate 33 is made of magnetically inductive material. The balance plate 33 is mounted above the circuit board 32 and includes a fixing hole 331 with a larger diameter such that an inner periphery defining the fixing hole 331 is not in contact with an axle tube 341 of the stator 34 when the balance plate 33 is mounted around the axle tube 341 of the stator 34. Namely, there is an appropriate gap between the inner periphery defining the fixing hole 331 and the axle tube 341. The balance plate 33 may include two equiangularly spaced notches 332, and the Hall sensor 322 on the circuit board 32 is extended through one of the notches 332. The Hall sensor 35 may detect a change in polarity of a permanent magnet 351 of the rotor 35.

Figure 8:
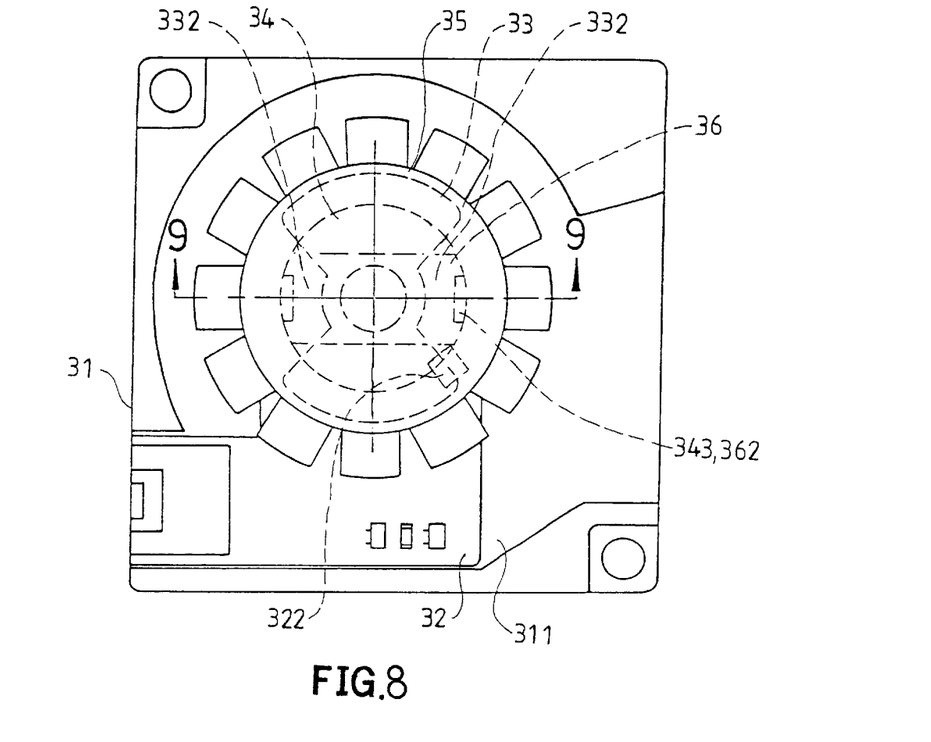
FIG. 8 is a top view of the D.C brushless motor in FIG. 7.
Figure 9:
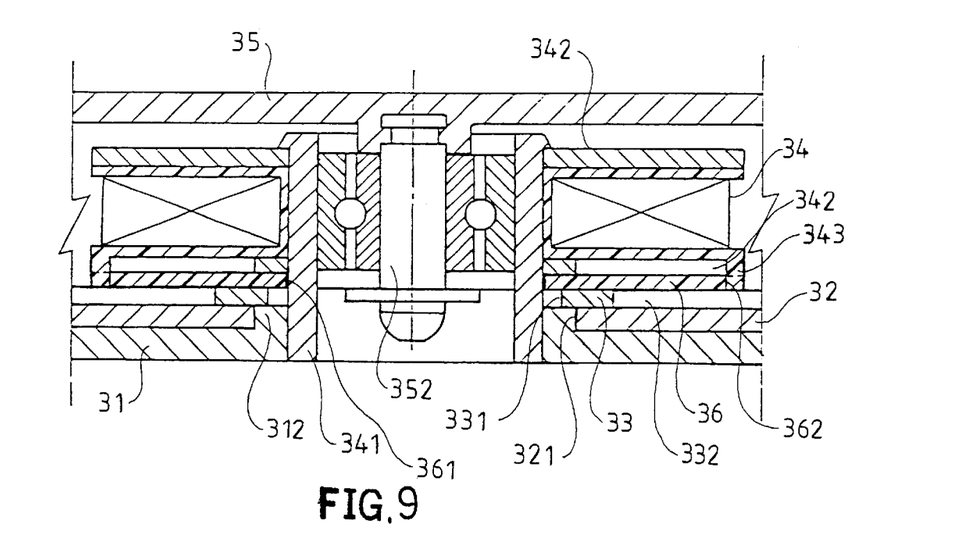
FIG. 9 is a sectional view taken along line 9—9 in FIG. 8.

The axle tube 341 of the stator 34 is made by any conventional methods and is mounted to the tube seat 312, while the rotor 35 includes a shaft 352 which is received in the axle tube 341. The permanent magnet 351 is mounted to an inner periphery of the rotor 35. The stator 34 further includes two protrusions 343 projecting downwardly therefrom. The protrusions 343 are made of magnetically non-inductive material and are provided for pressing against the magnetically non-inductive member 36. The magnetically non-inductive member 36 is substantially a plate made of magnetically non-inductive material. The magnetically non-inductive member 36 includes a hole 361 so as to be mounted around the axle tube 341 of the stator 34. When the axle tube 341 of the stator 34 is mounted to the tube seat 312, the magnetically non-inductive member 36 is pressed against by the protrusions 343 of the stator 34 to thereby press against the balance plate 33 and the circuit board 32 indirectly. The balance plate 33 and the circuit board 32 are thus fixed, and the balance plate 33 is neither in contact with the axle tube 341 of the stator 34 nor in contact with the lower pole plate 342 of the stator 34. The magnetically non-inductive member 36 includes two notches 362 into which the Hall sensor 322 on the circuit board 32 extends.

In assembly, referring to FIGS. 8 and 9, the circuit board 32 is mounted around the tube seat 312 via the fixing hole 321. The axle tube 341 of the stator 34 is mounted to the tube seat 312. The balance plate 33 and the magnetically non-inductive member 36 are mounted around the axle tube 341. The magnetically non-inductive member 36 separates the lower pole plate 342 of the stator 34 from the balance plate 33 to avoid magnetic inductivity therebetween. In addition, by means of fixing of the stator 34, the balance plate 33 is fixed indirectly via being pressed against by the magnetically non-inductive member 36. As a result, easy assembly and reliable positioning of the balance plate 33 are obtained. The permanent magnet 351 of the rotor 35 and the balance plate 33 attract each other to thereby assure stable rotational movements of the rotor 35. In addition, there is no magnetic inductivity between the balance plate 33 and the stator 34. The attractive force between the balance plate 33 and the permanent magnet 351 of the rotor 35 may be varied in response to the shape and dimension as well as number of the notches 332.

Figure 10:
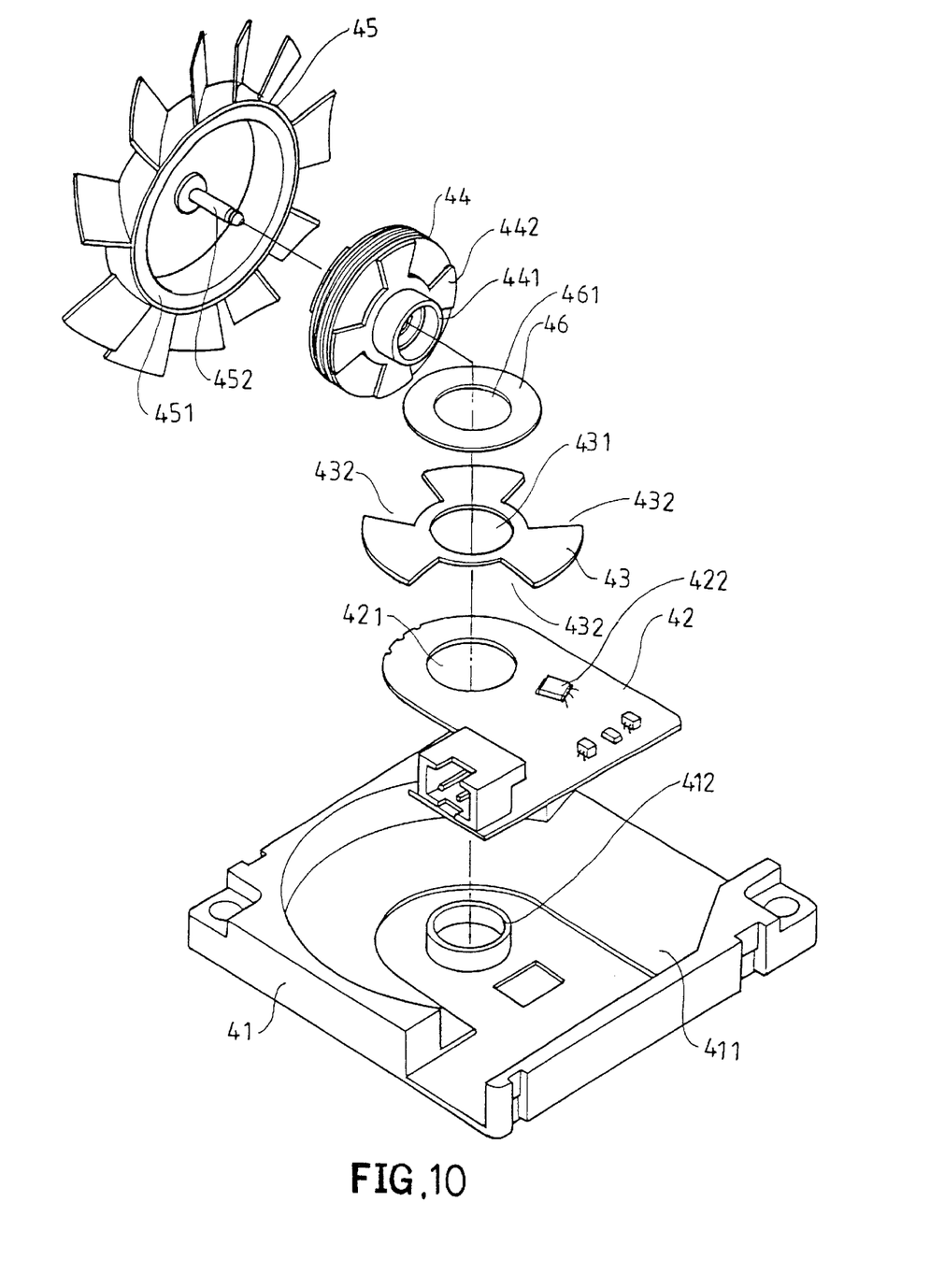
FIG. 10 is an exploded perspective view of a fourth embodiment of a D.C brushless motor in accordance with the present invention.

Referring to FIG. 10, a fourth embodiment of a D.C brushless motor in accordance with the present invention generally includes a housing 41, a circuit board 42, a balance plate 43, a stator 44, a rotor 45, and a magnetically non-inductive member 46. Still referring to FIG. 10, and further to FIG. 11, the housing 41 includes a compartment 411, and a bottom wall that defines the compartment 411 and a tube seat 412 formed thereon. The tube seat 412 of the housing 41 may be a tube projecting from the bottom wall of the housing 41. The circuit board 42 includes a fixing hole 421 so as to be mounted around the tube seat 412. A Hall sensor 422 and other electric elements are mounted on the circuit board 42. The balance plate 43 is made of magnetically inductive material. The balance plate 43 is mounted above the circuit board 42 and includes a fixing hole 431 with a larger diameter such that an inner periphery defining the fixing hole 431 is not in contact with an axle tube 441 of the stator 44 when the balance plate 43 is mounted around the axle tube 441 of the stator 44. Namely, there is an appropriate gap between the inner periphery defining the fixing hole 431 and the axle tube 441. In order to provide an appropriate attractive force between the balance plate 43 and a permanent magnet 451 of the rotor 45, the balance plate 43 includes equiangularly spaced notches 432. The Hall sensor 422 is received in one of the notches 432 to detect a change in polarity of the permanent magnet 451 of the rotor 45.

Figure 11:
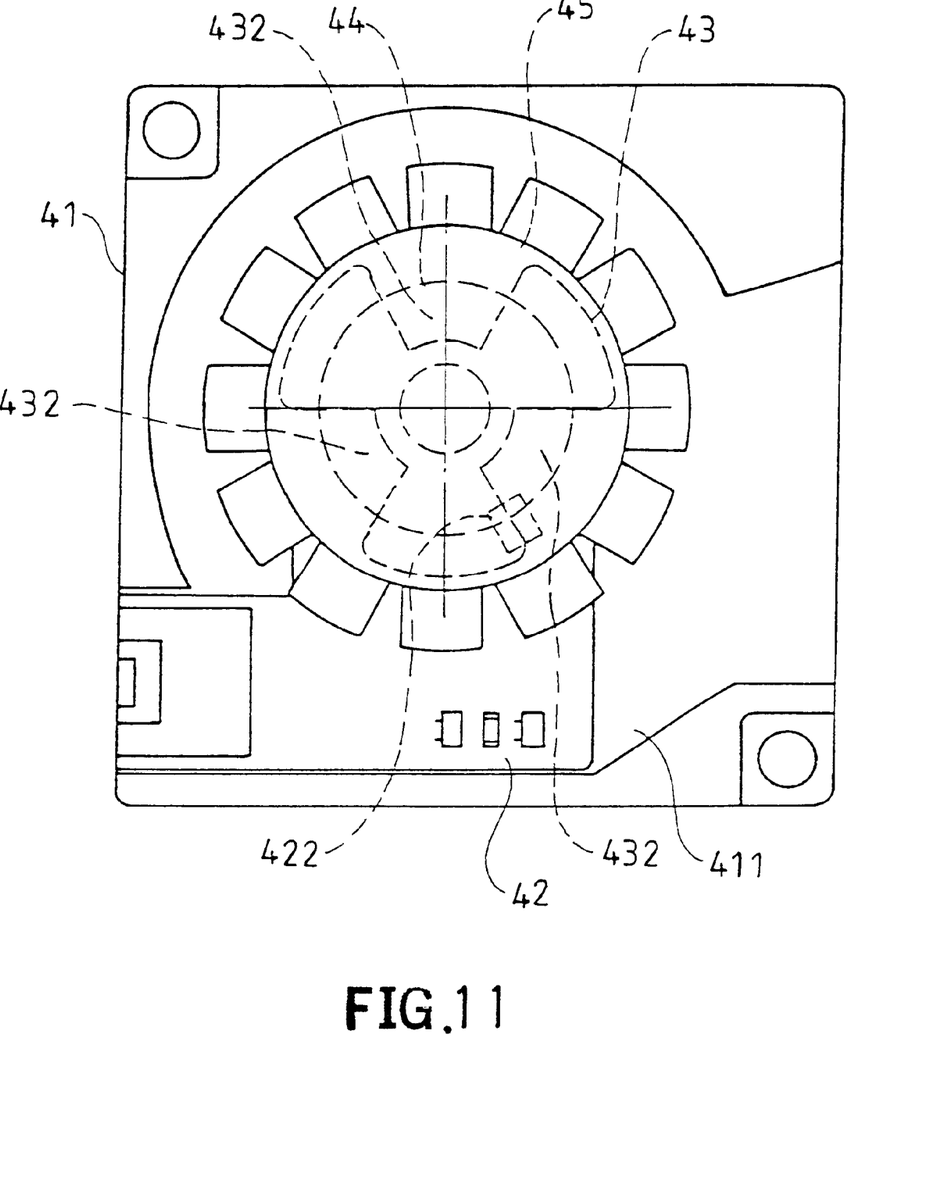
FIG. 11 is a top view of the D.C brushless motor in FIG. 10.

The stator 44 can be made by any conventional methods and includes a conventional axle tube 441 that is mounted to the tube seat 412, while the rotor 45 includes a shaft 452 which is received in the axle tube 441. The permanent magnet 451 is mounted to an inner periphery of the rotor 45. The magnetically non-inductive member 46 is substantially a. circular plate made of magnetically non-inductive material. The magnetically non-inductive member 46 includes a hole 461 so as to be mounted around the axle tube 441 of the stator 44. When the axle tube 441 of the stator 44 is mounted to the tube seat 412, the magnetically non-inductive member 46 is pressed against by a lower pole plate 442 of the stator 44 to thereby press against the balance plate 43 and the circuit board 42 indirectly. The balance plate 43 and the circuit board 42 are thus fixed, and the balance plate 43 is neither in contact with the axle tube 441 of the stator 44 nor in contact with the lower pole plate 442 of the stator 44.

In assembly, referring to FIG. 11, the circuit board 42 is mounted around the tube seat 412 via the fixing hole 421. The axle tube 441 of the stator 44 is mounted to the tube seat 412. The balance plate 43 and the magnetically non-inductive member 46 are mounted around the axle tube 441 with the balance plate 43 being not in contact with the axle tube 441 of the stator 44. The magnetically non-inductive member 46 separates the lower pole plate 442 of the stator 44 from the balance plate 43 to avoid magnetic inductivity therebetween (see FIG. 9). In addition, by means of fixing of the stator 44, the balance plate 43 is fixed indirectly via being pressed against by the magnetically non-inductive member 46. As a result, easy assembly and reliable positioning of the balance plate 43 are obtained. The attractive force between the balance plate 43 and the permanent magnet 451 of the rotor 45 may be varied in response to the shape and dimension as well as number of the notches 432. The permanent magnet 451 of the rotor 45 and the balance plate 43 attract each other to generate an appropriate attractive force to thereby assure stable rotational movements of the rotor 45. In addition, there is no magnetic inductivity between the balance plate 43 and the stator 44.

In accordance with the structure recited in claim 1 of the present application, by means of separating the balance plate from the axle tube of the stator and the lower pole plate of the stator by a magnetically non-inductive member, there is no magnetic inductivity between the balance plate and the stator. In addition, fixing and manufacture of the circuit board, balance plate, stator, and rotor become easier and more convenient due to provision of the magnetically non-inductive member.

In accordance with the structure recited in claim 5 of the present invention, there is no magnetic inductivity between the balance plate and the stator by means of fixing of the balance plate via provision of a magnetically non-inductive member and non-contact between the balance plate and the axle tube of the stator as well as the lower pole plate of the stator. Manufacture of the circuit board, balance plate, stator, and rotor become easier and more convenient due to provision of the magnetically non-inductive member.

In accordance with the structure recited in claim 2 or 6 of the present invention, the stator is securely engaged with the tube formed on the housing by the axle tube.

In accordance with the structure recited in claim 3 or 7 of the present invention, it is contemplated that the shape and dimension as well as number of the notches in the balance plate can be designed according to the required attractive force between the balance plate and the permanent magnet of the rotor.

In accordance with the structure recited in claim 4 or 8 of the present invention, the balance plate and the circuit board can be pressed against the housing to thereby provide more uniform attractive force between the balance plate and the permanent magnet of the rotor, thereby assuring stable rotation of the rotor.

Although the invention has been explained in relation to its preferred embodiment, it is to be understood that many other possible modifications and variations can be made without departing from the spirit and scope of the invention as hereinafter claimed.

What is claimed is:

1. A D.C brushless motor, comprising:
a housing including a compartment, a bottom wall defining the compartment having a tube seat formed thereon;
a stator including an axle tube mounted to the tube seat;
a rotor including a rotational axle that is received in the axle tube of the stator, the rotor further including a permanent magnet mounted to an inner periphery thereof;
a circuit board including a Hall sensor and a plurality of electric elements mounted thereon, the Hall sensor detecting a change in polarity of the permanent magnet;
a balance plate including a fixing hole so as to be mounted around the axle tube of the stator, an inner periphery defining the fixing hole of the balance plate and the axle tube having a gap therebetween, the balance plate being made of magnetically inductive material such that the balance plate and the permanent magnet of the rotor attract each other; and
a magnetically non-inductive member made of magnetically non-inductive material, the magnetically non-inductive member including a ring and a flange, the ring separating a lower pole plate of the stator from the balance plate, the flange being mounted into the gap between the inner periphery defining the fixing hole of the balance plate and the axle tube.

2. The D.C brushless motor as claimed in claim 1, wherein the tube seat of the housing is a tube projecting from the housing.

3. The D.C brushless motor as claimed in claim 1, wherein the balance plate includes a plurality of equiangularly spaced notches.

4. The D.C brushless motor as claimed in claim 1, wherein the balance plate is securely retained to the housing by a force for retaining the stator in place via the ring of the magnetically non-inductive member.

5. A D.C brushless motor, comprising:

a housing including a compartment, a bottom wall defining the compartment having a tube seat formed thereon;

a stator including an axle tube mounted to the tube seat;

a rotor including a rotational axle that is received in the axle tube of the stator, the rotor further including a permanent magnet mounted to an inner periphery thereof;

a circuit board including a Hall sensor and a plurality of electric elements mounted thereon, the Hall sensor detecting a change in polarity of the permanent magnet;

a balance plate including a fixing hole so as to be mounted around the axle tube of the stator, an inner periphery defining the fixing hole of the balance plate and the axle tube having a gap therebetween, the balance plate being made of magnetically inductive material such that the balance plate and the permanent magnet of the rotor attract each other; and a magnetically non-inductive member made of magnetically non-inductive material, the magnetically non-inductive member being mounted between the stator and the balance plate such that the balance plate is not in contact with the stator.

6. The D.C brushless motor as claimed in claim 5, wherein the tube seat of the housing is a tube projecting from the housing.

7. The D.C brushless motor as claimed in claim 5, wherein the balance plate includes a plurality of equiangularly spaced notches.

8. The D.C brushless motor as claimed in claim 5, wherein the stator includes at least one protrusion that presses against the magnetically non-inductive member to thereby securely press the balance plate and the circuit board against housing.

* * * * *